United States Patent [19]

Fintelmann et al.

[11] 4,024,206

[45] May 17, 1977

[54] STABILIZED BROMINATED POLYESTERS

[75] Inventors: Carl H. Fintelmann, Rancho Palos Verdes; Oscar C. Zaske, Palos Verdes Estates, both of Calif.

[73] Assignee: Vistron Corporation, Cleveland, Ohio

[22] Filed: Nov. 19, 1975

[21] Appl. No.: 633,281

[52] U.S. Cl. .................. 260/865; 260/45.8 NT; 260/869

[51] Int. Cl.² .................. C08K 5/34; C08K 5/53

[58] Field of Search ............. 260/2.5 AJ, 865, 869

[56] References Cited

UNITED STATES PATENTS

| | | | |
|---|---|---|---|
| 2,877,204 | 3/1959 | Duhnkrack et al. | 260/865 |
| 3,257,337 | 6/1966 | Schoepfle et al. | 260/2.5 |
| 3,321,553 | 5/1967 | Boyer et al. | 260/862 |
| 3,507,933 | 4/1970 | Larsen et al. | 260/869 |
| 3,536,782 | 10/1970 | Toggweiler et al. | 260/869 |
| 3,573,215 | 3/1971 | Nametz et al. | 252/192 |
| 3,642,944 | 2/1972 | Abbott, Jr. | 260/864 |
| 3,700,957 | 10/1972 | Daniels | 260/75 H |
| 3,758,638 | 9/1973 | Doerge et al. | 260/865 |
| 3,829,532 | 8/1974 | Meloy et al. | 260/864 |
| 3,911,050 | 10/1975 | Cooke et al. | 260/869 |

*Primary Examiner*—Melvyn I. Marquis
*Assistant Examiner*—R. A. White
*Attorney, Agent, or Firm*—John F. Jones; Sherman J. Kemmer

[57] ABSTRACT

Unsaturated polyesters containing bromine in them are stabilized against coloring caused by exposure to ultraviolet light and clouding with age by including in them dimethyl methyl phosphonate.

3 Claims, No Drawings

STABILIZED BROMINATED POLYESTERS

This invention relates to the manufacture of light-resistant, clear, brominated polyester resins, and more particularly pertains to polyester compositions composed of dibromoneopentyl glycol which are stabilized against coloring caused by exposure to ultraviolet light and clouding with age by including in them dimethyl methyl phosphonate.

The polyesters useful in the present invention are unsaturated polyesters containing an appreciable amount of bromine for flame resistance which contain sufficient olefinic unsaturation so as to be thermosetting, and this olefinic unsaturation is preferably supplied in the polyesters in the form of olefinically unsaturated dibasic acid moieties. The other portions of the preferred polyester molecules may be composed of saturated dibasic acid, aliphatic polyhydric alcohol and aromatic polyhydric alcohol moieties which must include some dibromoneopentyl glycol. Illustrative olefinically unsaturated dibasic acids and anhydrides, saturated dibasic acids and anhydrides, aliphatic polyhydric alcohols and aromatic polyhydric alcohols useful in the preparation of polyesters for this invention include the following:

Unsaturated Dibasic Acids and Anhydrides maleic acid
chloromaleic acid
ethylmaleic acid
maleic anhydride
citraconic anhydride
muconic acid
fumaric acid
aconitic acid
mesaconic acid
itaconic acid
tetrahydrophthalic acid

Saturated Dibasic Acids and Anhydrides adipic acid
azelaic acid
sebacic acid
dodecyl succinic acid
succinic acid
tetrachlorophthalic anhydride
phthalic anhydride
phthalic acid
isophthalic acid
hexahydrophthalic anhydride
malonic acid
citric acid

Aliphatic Polyhydric Alcohols ethylene glycol
propylene glycol
trimethylene glycol
triethylene glycol
pentaethylene glycol
polyethylene glycol
1,4-butanediol
diethylene glycol
dipropylene glycol
2,2-dimethyl-1,3-propanediol
hexamethylene glycol
1,4-cyclohexane dimethanol and the required
dibromoneopentyl glycol (having the formula

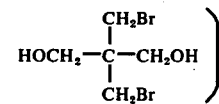

Aromatic Polyhydric Alcohols xylene alcohols
ethyl resorcinol
propyl resorcinol
2,4-dimethyl resorcinol
3,6-dimethyl-1,2,4-benzenetriol
ethyl pyrogallol
2,4-methyl-1,4-dihydroxy naphtalene
3-methyl-1,4,5-naphthalene triol
dimethylol toluene
dimethylol xylene
bis-hydroxy ethyl or bis-hydroxy propyl ethers of resorcinol, cathechol or hydroquinone
1,5-dihydroxy naphthalene
4,4'-isopropylidene-bis-phenol The polyesters of this invention are preferably mixed with a polymerizable monomer to give a liquid, curable mixture. The copolymerizable monomers used in conjunction with the unsaturated polyesters in this invention are preferably liquid vinyl monomers which act as solvents for the polyester and give pourable solutions in admixture with the polyester. Useful copolymerizable monomers include styrene, substituted styrenes such as alpha-methyl styrene, vinyl toluenes, vinyl xylenes, nuclear halogenated styrenes such as o-chlorostyrene, p-chlorostyrene, m-chlorostyrene, mixtures thereof, the corresponding bromostyrenes, liquid acrylic esters, methacrylic esters, and the like. Most preferred in styrene. The weight ratio of unsaturated polyester to copolymerizable monomer is preferably from about 50:50 to 75:25.

Useful promoters include quaternary ammonium salts alone or with cobalt organic salts, quinones, hydroquinone, calcium, magnesium, vanadium, and copper salts, and as catalyst benzoyl peroxide, hydrogen peroxide, cumene hydroperoxide, alkyl peroxydicarbonates, or methyl ethyl ketone peroxide. The promoters are preferably present in from 0 to about 3 parts by weight per 100 parts by weight of combined unsaturated polyester-copolymerizable monomer mixture. Ultraviolet stabilizers such as benzophenones, benzotriazoles, salicylic acid and the like are preferably included.

The dimethyl methyl phosphonate useful in this invention has the formula

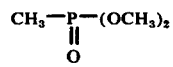

and is most useful in the range of from 1 to 10 parts by weight per 100 parts by weight of combined unsaturated polyestercopolymerizable monomer mixture. The dimethyl methyl phosphonate imparts excellent resistance to yellowing under the influence of ultraviolet light in the cured resin composition.

The dibromoneopentyl glycol-based polyesters embodied herein can be mixed with other polyesters and still be within the scope of this invention so long as the amount of bromine in the product falls in the range of from 4 to 40% by weight.

Mixtures of unsaturated polyesters containing dibromoneopentyl glycol in them with other types of unsaturated polyesters are contemplated to be within the scope of the present invention.

EXAMPLE 1

A. A flame-resistant styrenated dibromoneopentyl glycol unsaturated polyester was prepared as follows:

Into a resin flask equipped with a heating mantle, a motor-driven stirrer, a total condenser and a nitrogen-gas sparging tube were charged 490 grams of maleic anhydride, 740 grams of phthalic anhydride and 3140 grams of dibromoneopentyl glycol. The flask then was slowly heated with nitrogen sparging until the contents had liquified and stirring could be started. The heating was then continued at a faster rate until a cook temperature of 350° F was reached. The nitrogen flow rate through the sparger was initially set at 0.04 cubic foot per gallon of cook. At a temperature of about 300° F, the first esterification water came over. At this point, the nitrogen flow through the sparger was increased to 0.1326 cubic foot per gallon of cook. Cooking was continued until an acid number of 38 was reached. The resulting polyester was then thinned with 1690 grams of styrene monomer containing 0.066 gram of hydroquinone. The mixture was cooled rapidly to give 5850 grams of styrenated dibromoneopentyl glycol polyester resin. The product was a viscous, reddish-brown colored liquid with a characteristic styrene odor.

B. A general-purpose polyester resin was prepared as follows:

Into a resin flask equipped with a heating mantle, a motor-driven stirrer, a packed fractionating column, a total condenser and a nitrogen-gas sparging tube were charged 1370 grams of propylene gylcol, 1500 grams of phthalic anhydride, and 622grams of maleic anhydride. The flask was heated slowly with minimal nitrogen sparging until the contents had melted into slurry form. The temperature was then raised slowly with a sparger rate of about 0.005 cubic foot of nitrogen per gallon of cook until a cook temperature of 400° F was reached. The first water of reaction started to come off at between 300° and 350° F. The rate of heat input to the cook was then adjusted so that a column-top temperature of 215°–220° F was maintained. The mixture was cooked to an acid number of 20–30 and was then cooled to 350° F. At this point, the resin was combined with 1414 grams of styrene containing 0.4 gram of hydroquinone using good agitation and rapid cooling during the mixing.

C. A blend of the above resins was prepared by mixing 5850 grams of resin A with 3341 grams of resin B along with 587 grams of dimethyl methyl phosphonate (6%). The resulting mixture had a bromine content of about 19.5%.

D. A blend as in C above was prepared except that 6% by weight of the blend was triethyl phosphate instead of dimethyl methyl phosphonate.

EXAMPLE 2

Samples of blends from Example 1C and 1D were also stablized each with 0.7 phr (parts per hundred of resin) of Tinuvin P (Geigy benzotriazole ultraviolet absorber). The resins were catalyzed with a mixture of 0.9 phr of benzoyl peroxide and 0.5 phr of cumene hydroperoxide. Hand-lay-up laminates of resin sand fiberglass were made between two sheets of cellophane. The laminates were placed between two flat metal sheets and cured in an oven at 250° F for 30 minutes. To test specimens for the weatherometer test, a Model B Beckman Spectrometer equipped with an integrating chamber was used to determine yellowness of the samples before (unexposed) and after exposure for 2000 hours in the weatherometer. The following observations were made:

| Resin | Yellowness Index* (YI) | | |
|---|---|---|---|
| | Control (unexposed) | 2000 Hours | Δ YI* |
| Example 1C | 28 | 41 | 13 |
| Example 1D | 28 | 65 | 37 |

*Yellowness index (YI) is obtained by measuring reflectance and is reflectance at
$$\frac{600\ m\mu - 420\ m\mu}{560\ m\mu} \times 100 = YI$$

It was also observed that the resins of Example 1 without dimethyl methyl phosphonate on storage slowly became turbid and began to gel whereas when a small amount of dimethyl methyl phosphonate was included in the resin, this turbidity and gelling were prevented.

EXAMPLE 3

In an experiment which is outside the scope of the present invention, test specimens were prepared in accordance with Example 2 using the polyester-monomer mixture described in Example 1B which also contained Tinuvin P and in one case no dimethyl methyl phosphonate and in the other case 4% by weight of dimethyl methyl phosphonate. The two samples were exposed in a fadeometer for 1008 hours with the following results:

| Dimethyl Methyl Phosphonate | yellowness Index | | |
|---|---|---|---|
| | Unexposed | 1008 Hours | Δ YI |
| none | 22 | 69 | 47 |
| 4% | 22 | 66 | 44 |

Thus, it can be seen that the inclusion of dimethyl methyl phosphonate in the usual type of polyester (non-brominated) contributes essentially nothing to the ultraviolet stability of the cured product.

EXAMPLE 4

In another experiment which is also outside the scope of the present invention, a polyester resin was prepared from tetrabromophthalic anhydride, propylene glycol and maleic anhydride and diluted with styrene by the procedure of Example 1A. This resin was mixed with a resin prepared as in Example 1B to give a product having a bromine content of 22.9% by weight. This resin was compounded with Tinuvin P and one portion was also compounded with 6% dimethyl methyl phosphonate. Test specimens were prepared from each according to Example 3, and the following results were obtained in the fadeometer:

| Dimethyl Methyl Phosphonate | Yellowness Index | | |
|---|---|---|---|
| | Unexposed | 248 Hours | Δ YI |
| none | 77 | 112 | 35 |

-continued

| Dimethyl Methyl Phosphonate | Yellowness Index | | |
|---|---|---|---|
| | Unexposed | 248 Hours | Δ YI |
| 6% | 59 | 95 | 36 |

Thus, it can be readily seen that the inclusion of dimethyl methyl phosphonate into a bromine containing polyester resin wherein the bromine is not in the form of dibromoneopentyl glycol has no effect on the stability of the cured product to ultraviolet-light exposure.

We claim:
1. An unsaturated polyester resin-monomer mixture in which the polyester contains from about 4 to 40% by weight of bound bromine in the form of dibromoneopentyl glycol moieties in the resin containing from 1 to 10 parts by weight per 100 weight of resin-monomer of dimethyl methy phosphonate.
2. The composition of claim 1 wherein the monomer is styrene.
3. The composition of claim 2 wherein there is included a benzotriazole ultraviolet-light stabilizer in addition to the dimethyl methyl phosphonate.

* * * * *